(12) United States Patent
Linsenmeyer et al.

(10) Patent No.: US 8,736,455 B2
(45) Date of Patent: May 27, 2014

(54) FLUID VOLUME ALARM SYSTEM

(76) Inventors: Todd A. Linsenmeyer, Mountain Lakes, NJ (US); Joseph V. DiTrolio, Roseland, NJ (US); Dorothy F. Linsenmeyer, Mountain Lakes, NJ (US)

( * ) Notice: Subject to any disclaimer, the term of this patent is extended or adjusted under 35 U.S.C. 154(b) by 736 days.

(21) Appl. No.: 12/814,898

(22) Filed: Jun. 14, 2010

(65) Prior Publication Data
US 2011/0304468 A1 Dec. 15, 2011

(51) Int. Cl.
G08B 21/00 (2006.01)
G08B 23/00 (2006.01)
A61F 2/00 (2006.01)
A61F 5/44 (2006.01)

(52) U.S. Cl.
USPC .......... 340/620; 340/573.1; 340/612; 600/29; 600/30; 600/31; 600/32; 604/11; 604/19; 604/331; 604/349; 604/544

(58) Field of Classification Search
USPC ........ 340/612, 573.5, 573.1; 604/11, 19, 544, 604/317, 318, 327, 328, 329, 330, 331, 345, 604/349
See application file for complete search history.

(56) References Cited

U.S. PATENT DOCUMENTS

| | | | |
|---|---|---|---|
| 3,582,935 A | 6/1971 | Verbaeghe | |
| 3,601,119 A | 8/1971 | Engelsher | |
| 3,670,320 A | 6/1972 | Palmer | |
| 3,769,497 A | 10/1973 | Frank | |
| 3,977,567 A | 8/1976 | Rudd | |
| 4,095,589 A | 6/1978 | Manschot | |
| 4,224,610 A | 9/1980 | Quinby | |
| 4,258,444 A | 3/1981 | Orszullok | |
| 4,573,984 A | 3/1986 | Benzies | |
| 4,631,061 A | 12/1986 | Martin | |
| 4,644,789 A * | 2/1987 | Snyder | 73/290 V |
| 4,739,786 A | 4/1988 | Parkinson | |
| 4,757,305 A | 7/1988 | Peso | |
| 4,913,161 A | 4/1990 | Villari | |

(Continued)

FOREIGN PATENT DOCUMENTS

| | | |
|---|---|---|
| CN | 2237438 Y | 10/1996 |
| EP | 070655 | 1/1983 |
| WO | 03055423 | 7/2003 |
| WO | 2007111891 | 10/2007 |

OTHER PUBLICATIONS

International Search Report and Written Opinion issued in PCT/US2011/039694 on Oct. 5, 2011.

Primary Examiner — Daniel Wu
Assistant Examiner — Mancil Littlejohn
(74) Attorney, Agent, or Firm — FisherBroyles, LLP; Anthony J. DoVale

(57) ABSTRACT

A fluid volume alarm system is presented. The alarm system has a container for storing fluid, and alarm module coupled to the container for notifying a user or observer that the fluid within the container has reached a predetermined level. The container has at least one exterior wall and defines an interior volume for at least temporary storage of fluid. In one aspect, there are at least two electrodes disposed on an interior portion of the exterior wall of the container and positioned at a position thereon an interior portion of the exterior wall corresponding to a predetermined fluid level at which it is desirable to receive an alarm. The system also has an alarm module configured to alert the practitioner that the fluid has met or has exceeded the predetermined level.

26 Claims, 12 Drawing Sheets

(56) References Cited

U.S. PATENT DOCUMENTS

| | | | |
|---|---|---|---|
| 5,466,229 A | 11/1995 | Elson | |
| 5,517,181 A * | 5/1996 | Gray et al. | 340/605 |
| 5,709,222 A * | 1/1998 | Davallou | 128/885 |
| 5,793,294 A * | 8/1998 | Schepka | 340/616 |
| 6,121,555 A | 9/2000 | Nowosielski | |
| 6,296,627 B1 * | 10/2001 | Edwards | 604/347 |
| 6,480,113 B1 | 11/2002 | Esposito | |
| 7,066,919 B1 * | 6/2006 | Sauerland et al. | 604/327 |
| 7,131,966 B1 | 11/2006 | Tamari | |
| 7,487,677 B2 * | 2/2009 | Chai et al. | 73/304 R |
| 2008/0000019 A1 | 1/2008 | Marinas | |
| 2010/0030167 A1 * | 2/2010 | Thirstrup et al. | 604/318 |

* cited by examiner

FLUID VOLUME ALARM SYSTEM

FIELD OF THE INVENTION

Presented herein is a fluid volume alarm system. More specifically, presented herein is a fluid volume alarm system for providing an alarm when the level of fluid within a container surpasses or goes below a predetermined level.

BACKGROUND OF THE INVENTION

Often times, Indwelling catheters have widespread use for a number of medical conditions. They are used for those who are unable empty their bladders (urinary retention) or unable to hold back their urine (urinary incontinence). They may be passed into the bladder through the urethra or surgically placed into the bladder from a suprapubic location. Indwelling catheters are also used to monitor urine output, typically for post-surgical or acutely ill hospitalized patients, or to drain the bladders of patients who are unconscious. The catheter is attached to a fluid collection bag.

However, when a catheter is inserted, the bladder becomes colonized with bacteria within several days. Careful drainage of the fluid collection bag allows urine to flow freely from the bladder through the catheter and into the drainage bag. However if urine does not drain freely into the bag the bladder becomes over stretched.

The over stretched bladder causes breaks in the bladder mucosa which can allow the colonized bacteria to cause a bladder infection. Of even more concern is that an over stretched bladder can force the colonized bacteria to get into the bloodstream (bacteremia), causing fever and a severe infection. Catheter associated urinary tract infections are the leading cause of secondary bloodstream infections; about 17% of hospital-acquired bacteremias are from a urinary source, with an associated mortality of approximately 10%. In the nursing home setting, catheters are the most common cause of bacteria getting into the bloodstream.

Practitioners like to know the status of a fluid collection bag because, when a fluid collection bag becomes over-filled it will not allow any further drainage of urine into the fluid collection bag, resulting in back pressure and causing the bladder to get over distended.

Men may have incontinence (loss) of urine for a variety of reasons. One method used to stay dry is to wear an external condom catheter applied over the penis, which is attached to a urine collection bag. If the urine collection bag becomes over-filled, it can cause the external condom catheter to fall off, causing significant embarrassment due to urine leakage. There are two major reasons that the external condom catheter may fall off the penis. First, the over-filled collecting bag may cause back up of urine into the tube and stretch up the condom, pulling it on the skin. Second, the over-filled collection bag may get too heavy and pull the condom off the skin.

Another reason practitioners may want to know the status of the fluid in a fluid-filled bag is that fluid, such as sterile water or saline, may be infused from the fluid filled bag, through the catheter tubing and into the bladder to rinse the bladder to deliver medications or to prevent blood clots from forming if blood is collecting in the bladder. Not immediately replacing an empty the fluid filled bag to allow continuous drainage can allow an interruption in medications or the formation of blood clots. These blood clots can, then, obstruct the catheter, causing bladder over distention with the same problems discussed above.

SUMMARY

Presented herein is a fluid level alarm system. In one aspect, the alarm system comprises a container for storing fluid, and alarm module coupled to the container for notifying a user or observer that the fluid within the container has reached a predetermined level.

In one aspect, the container has at least one exterior wall and defines an interior volume for at least temporary storage of fluid, a first opening, and a second opening for exit of fluid. The first opening can be for the ingress of fluid, in the case of a urinary collection bag or similar system. The first opening can also be for venting the interior volume to the atmosphere, in the case of an intravenous bag or similar system. In another aspect, the first opening is configured to permit fluid entry and to prevent fluid exit via the first opening. In yet another aspect, the second opening is configured to selectively permit exit of the fluid from the container.

In another aspect, the system comprises at least two electrodes disposed on an interior portion of the exterior wall of the container. At least one of the electrodes is positioned at a position thereon an interior portion of the exterior wall corresponding to a predetermined fluid level at which it is desirable to receive an alarm. In this configuration, the fluid contained within the container completes a circuit between the at least two electrodes.

The system also comprises an alarm module coupled to a power supply. The alarm module comprises at least two terminals, each in electrical communication with one of the at least two electrodes. In use, in one aspect, when the fluid in the container reaches the predetermined fluid level, the fluid disposed within the interior volume of the container completes an electrical circuit between the at least two electrodes and the alarm module. This energizes the alarm and alerts the practitioner that the fluid has met or has exceeded the predetermined level.

Other aspects and embodiments of the alarm system are described herein. This description is meant to fully describe the system, but not limit its design, function, or application.

DETAILED DESCRIPTION OF THE FIGURES

These and other features of the preferred embodiments of the invention will become more apparent in the detailed description in which reference is made to the appended drawings wherein.

DETAILED DESCRIPTION OF THE INVENTION

Figure 1:
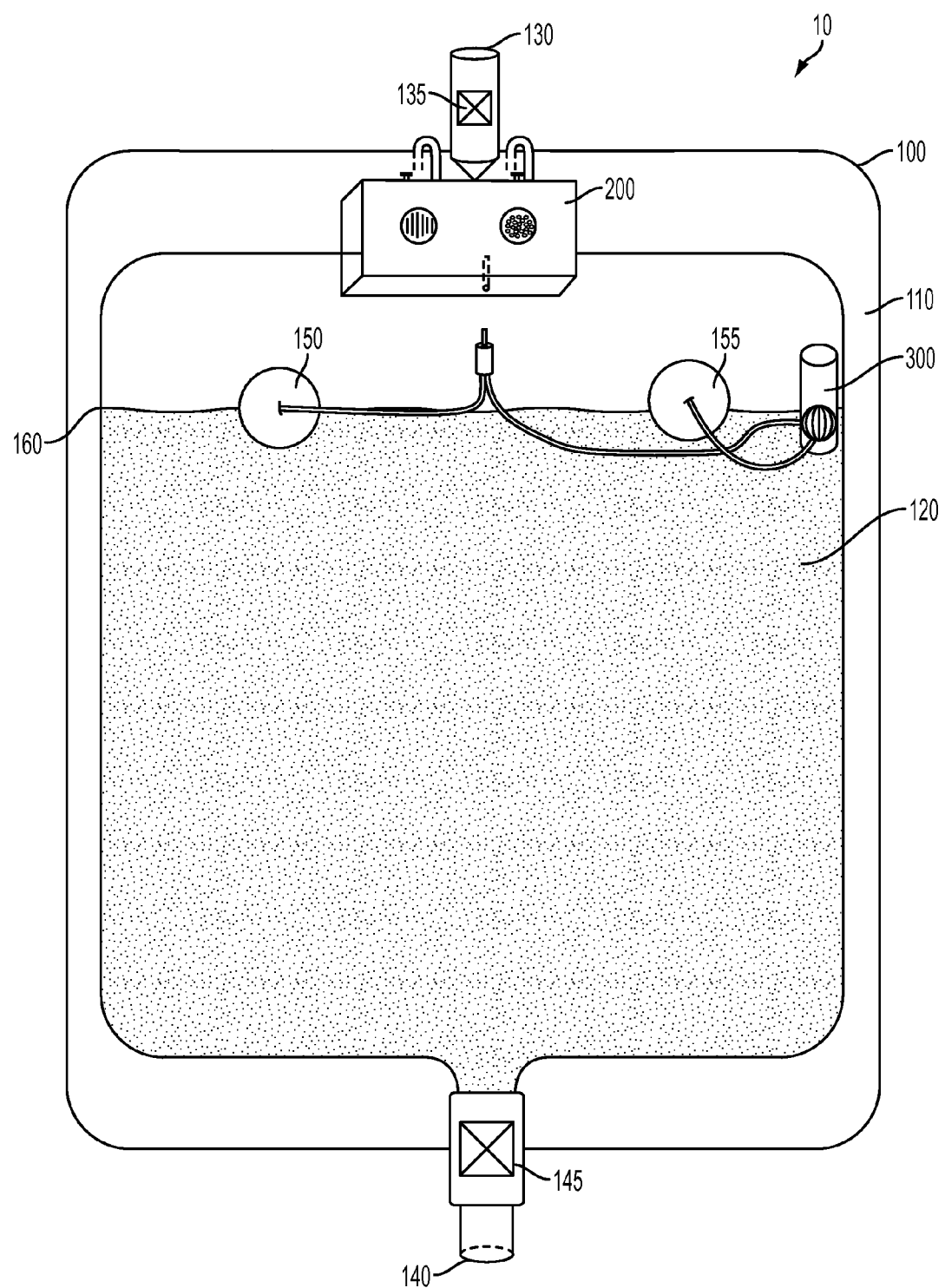
FIG. 1 is a front elevational view of one aspect of a fluid volume alarm system.
Figure 2:
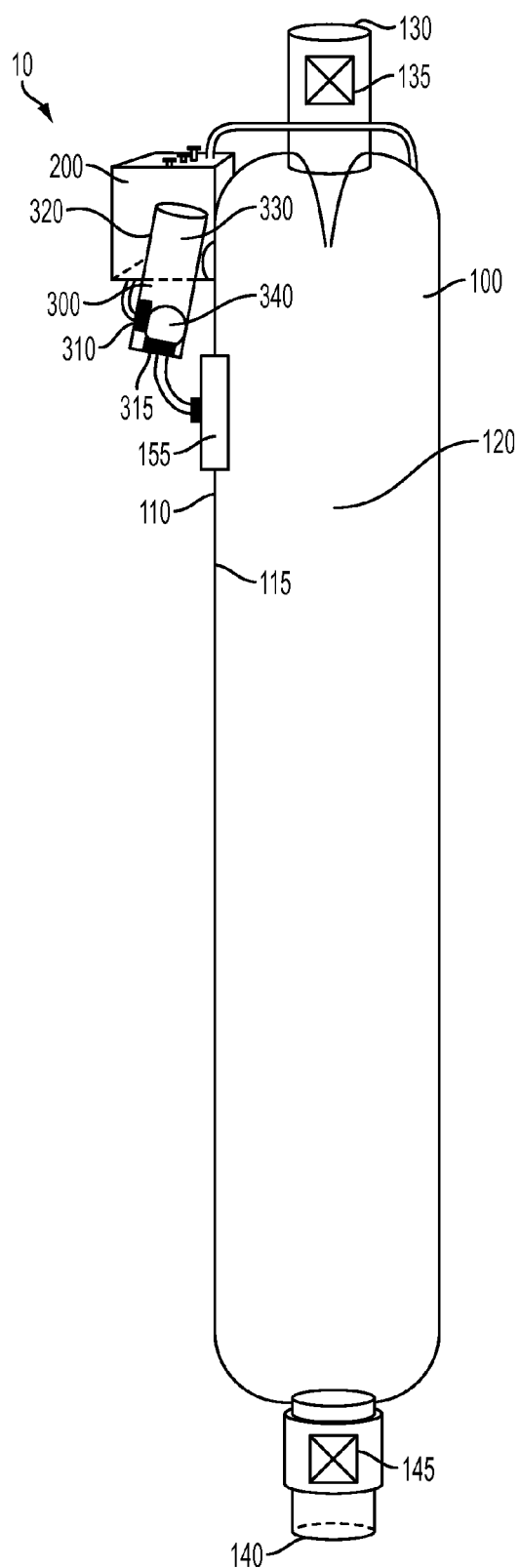
FIG. 2 is a right side elevational view of the fluid volume alarm system of FIG. 1.
Figure 3:
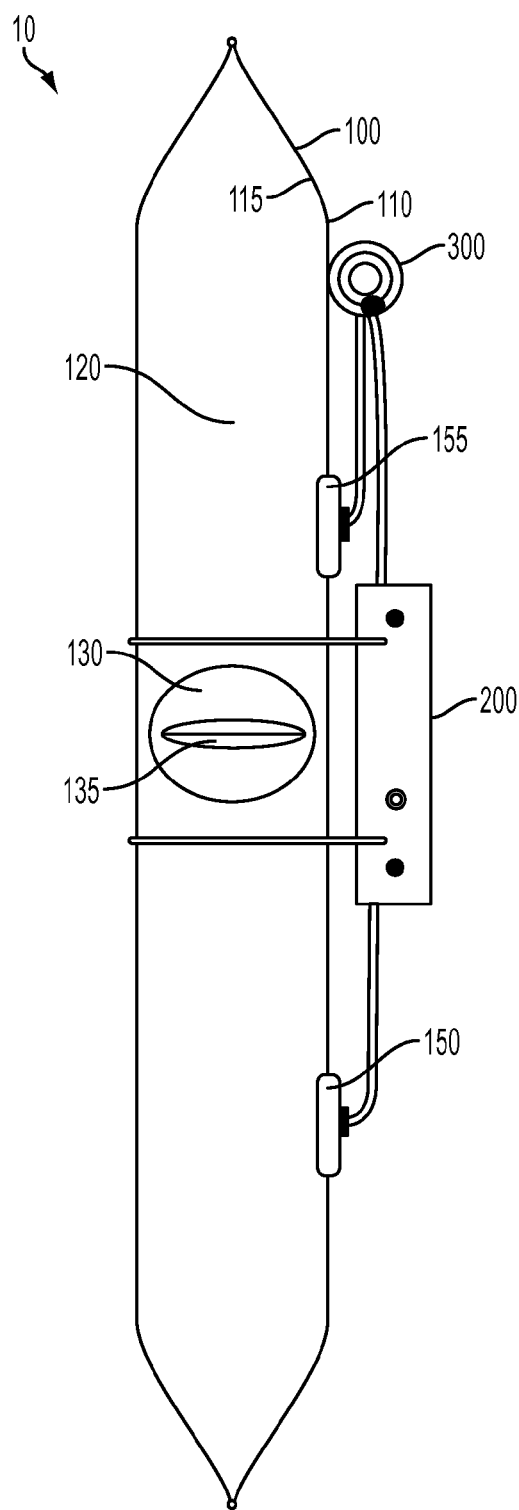
FIG. 3 is a plan view of the fluid volume alarm system of FIG. 1.
Figure 4:
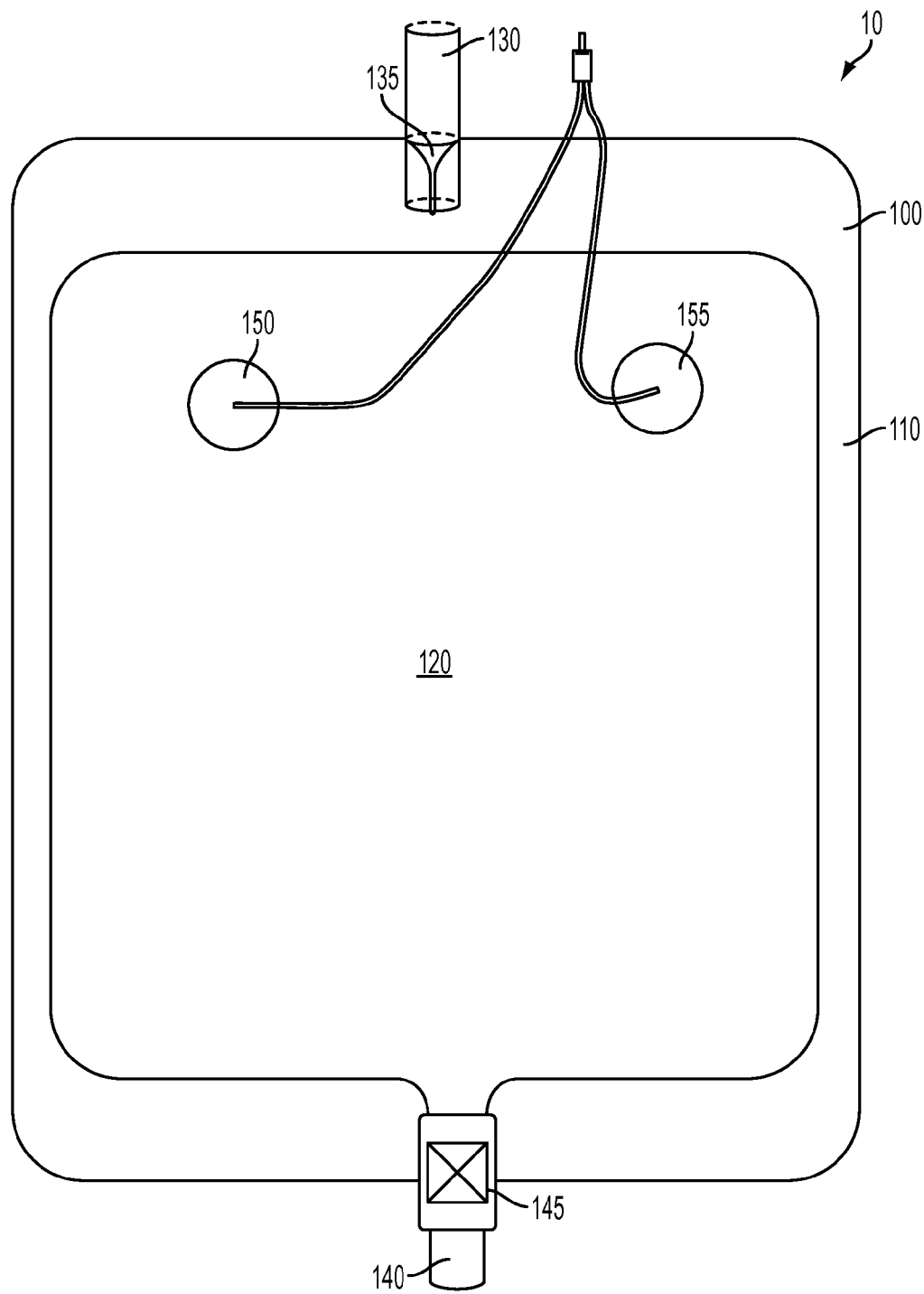
FIG. 4 is a front elevational view of another aspect of a fluid volume alarm system, illustrated without a tilt mechanism.
Figure 5:
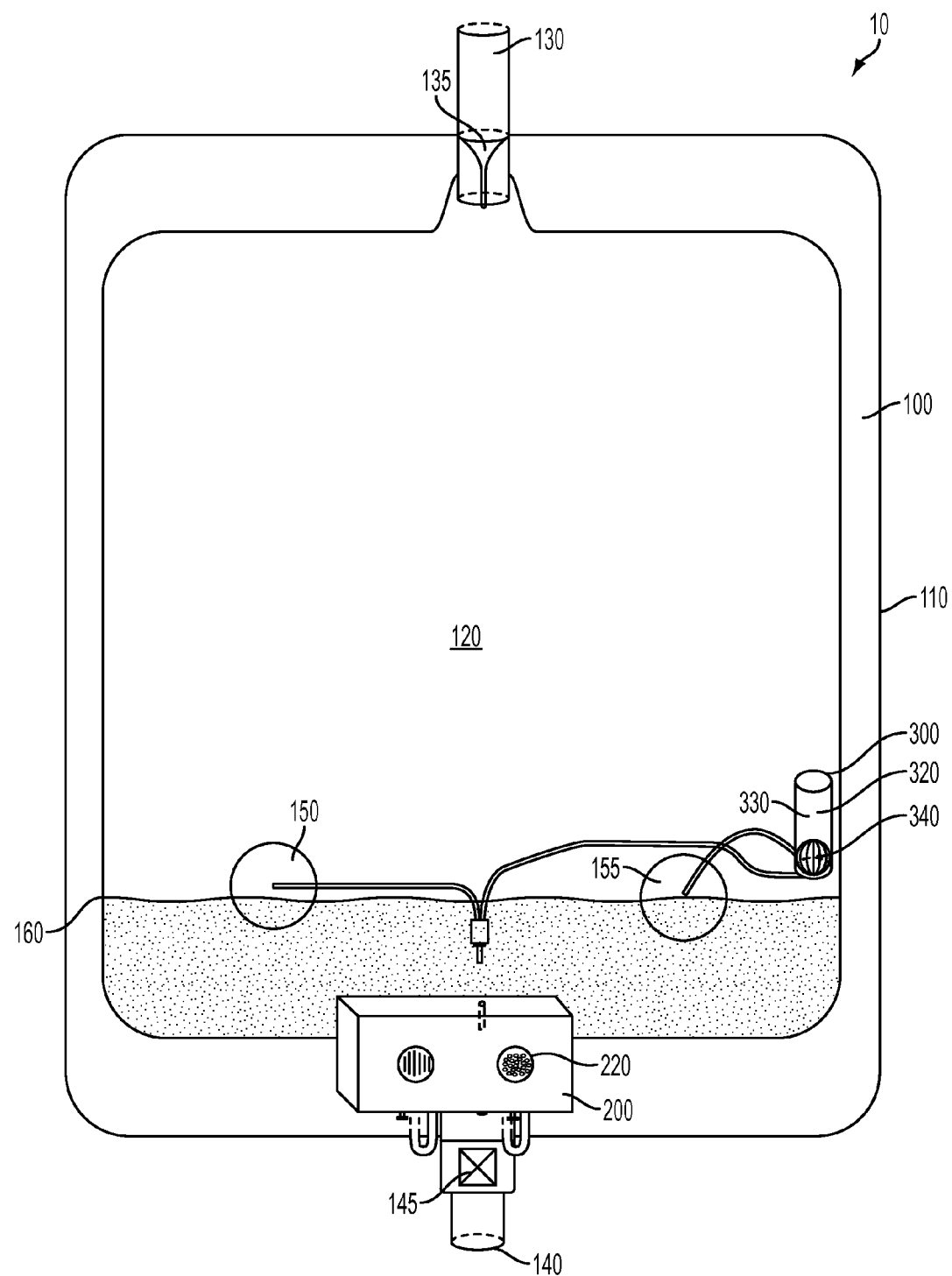
FIG. 5 is a front elevational view of another aspect of a fluid volume alarm system, showing a system configured for sensing a low fluid level.
Figure 6:
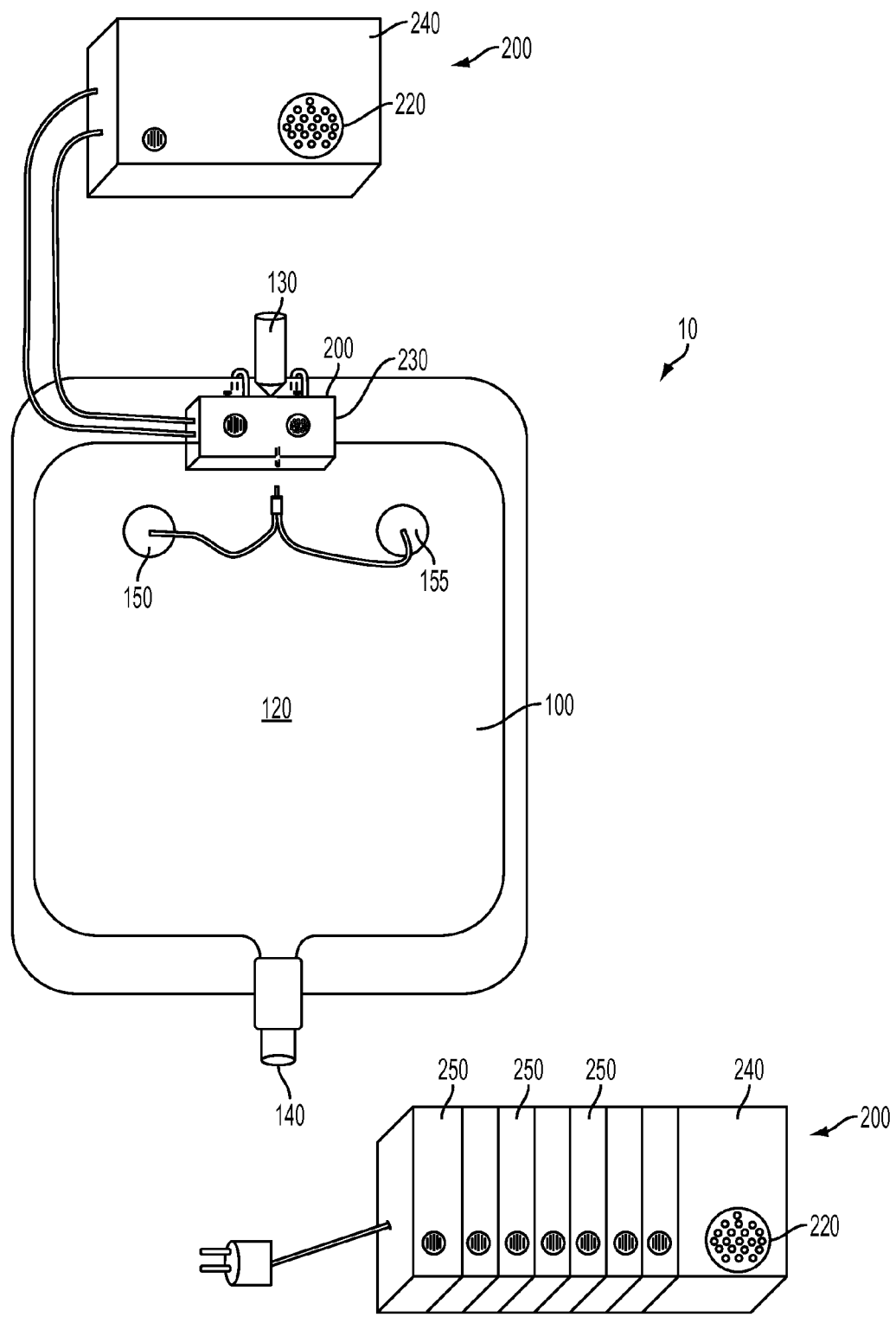
FIG. 6 is a front elevational view of one aspect of a fluid volume alarm system showing an alarm module both wired and wireless.
Figure 7:
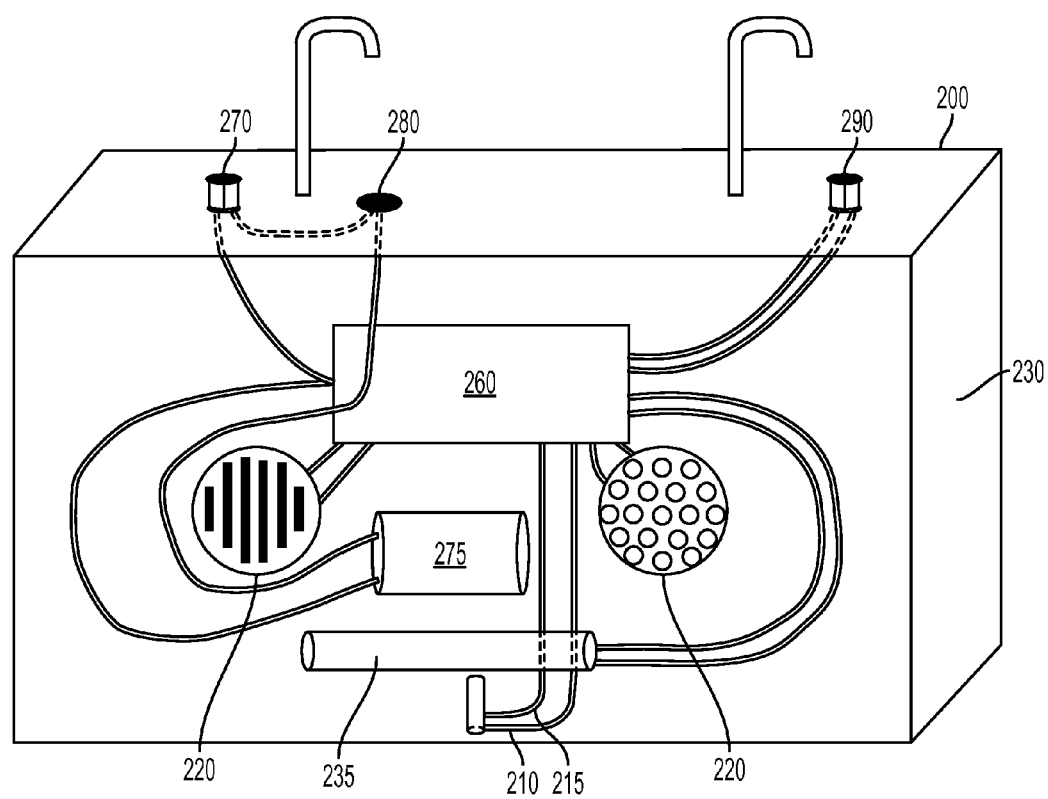
FIG. 7 is a partially transparent front elevational view of one aspect of an alarm module.
Figure 8:
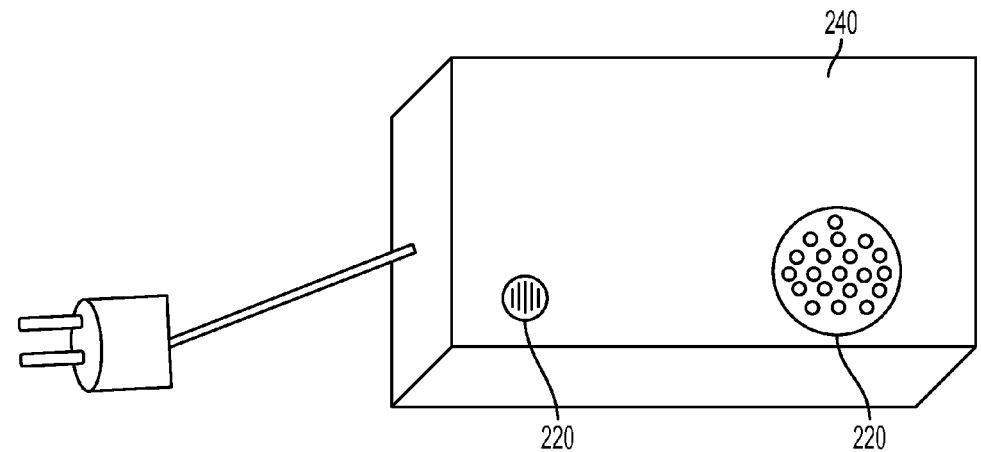
FIG. 8 is a front elevational view of one aspect of a single channel secondary alarm unit.
Figure 8:
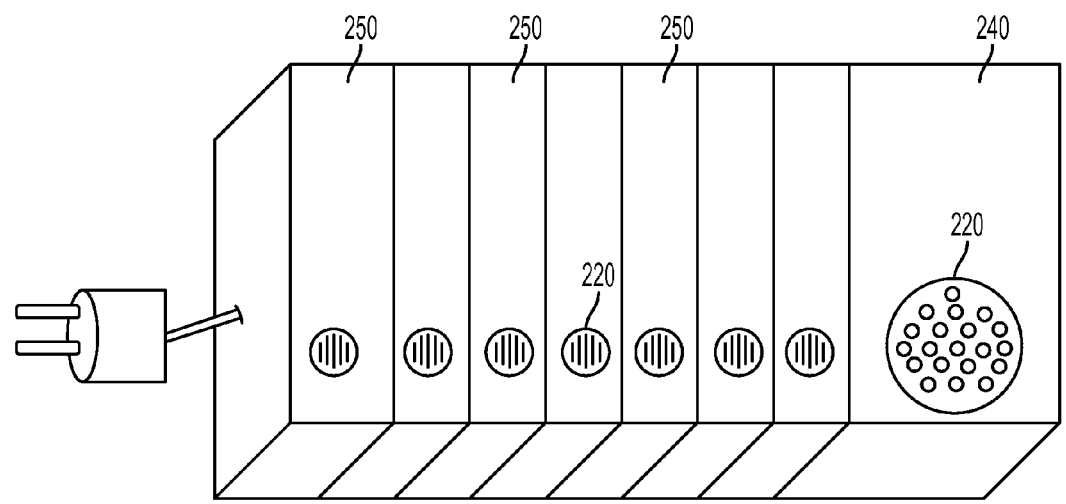
Figure 9:
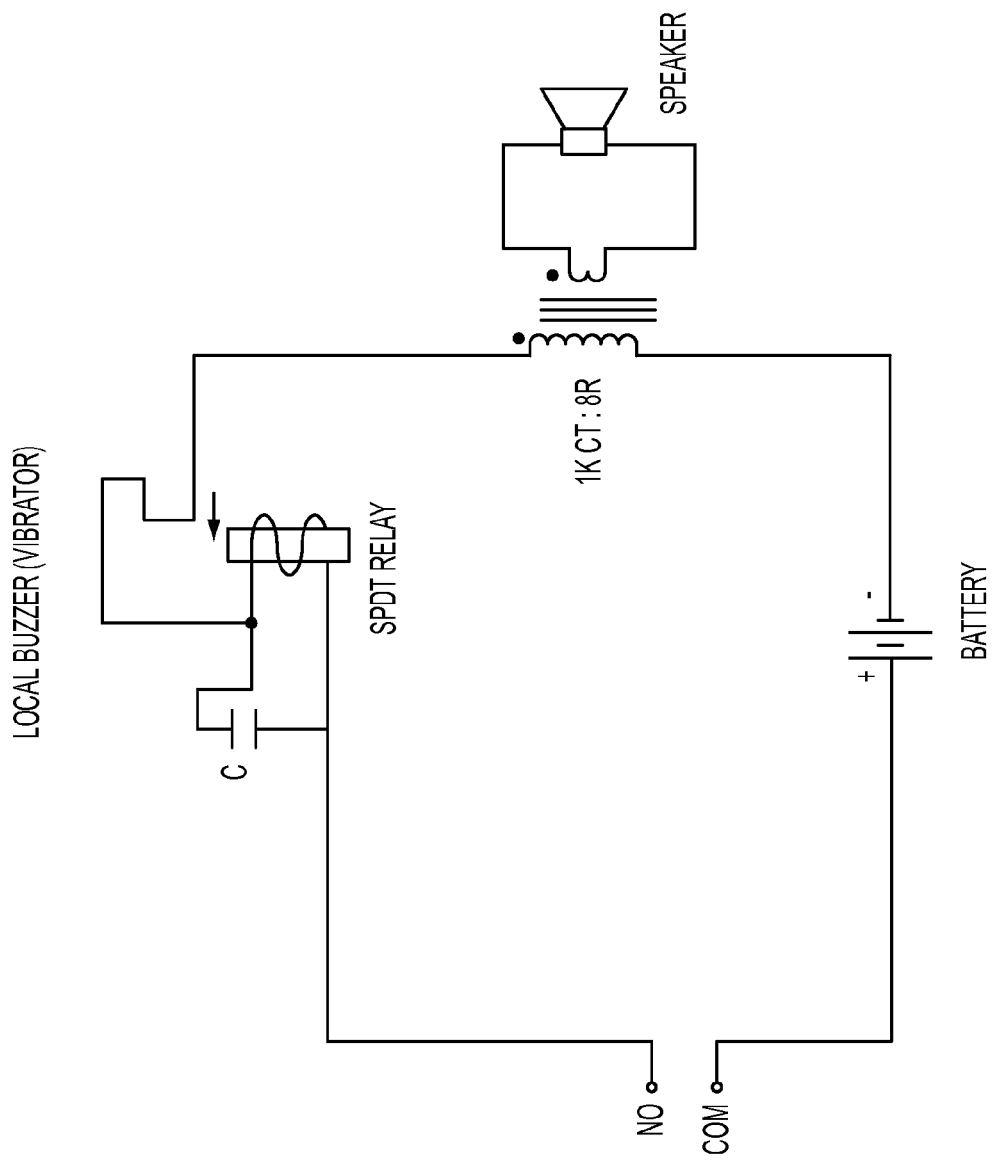
FIG. 9 is a front elevational view of one aspect of a multi-channel secondary alarm unit.
Figure 10:
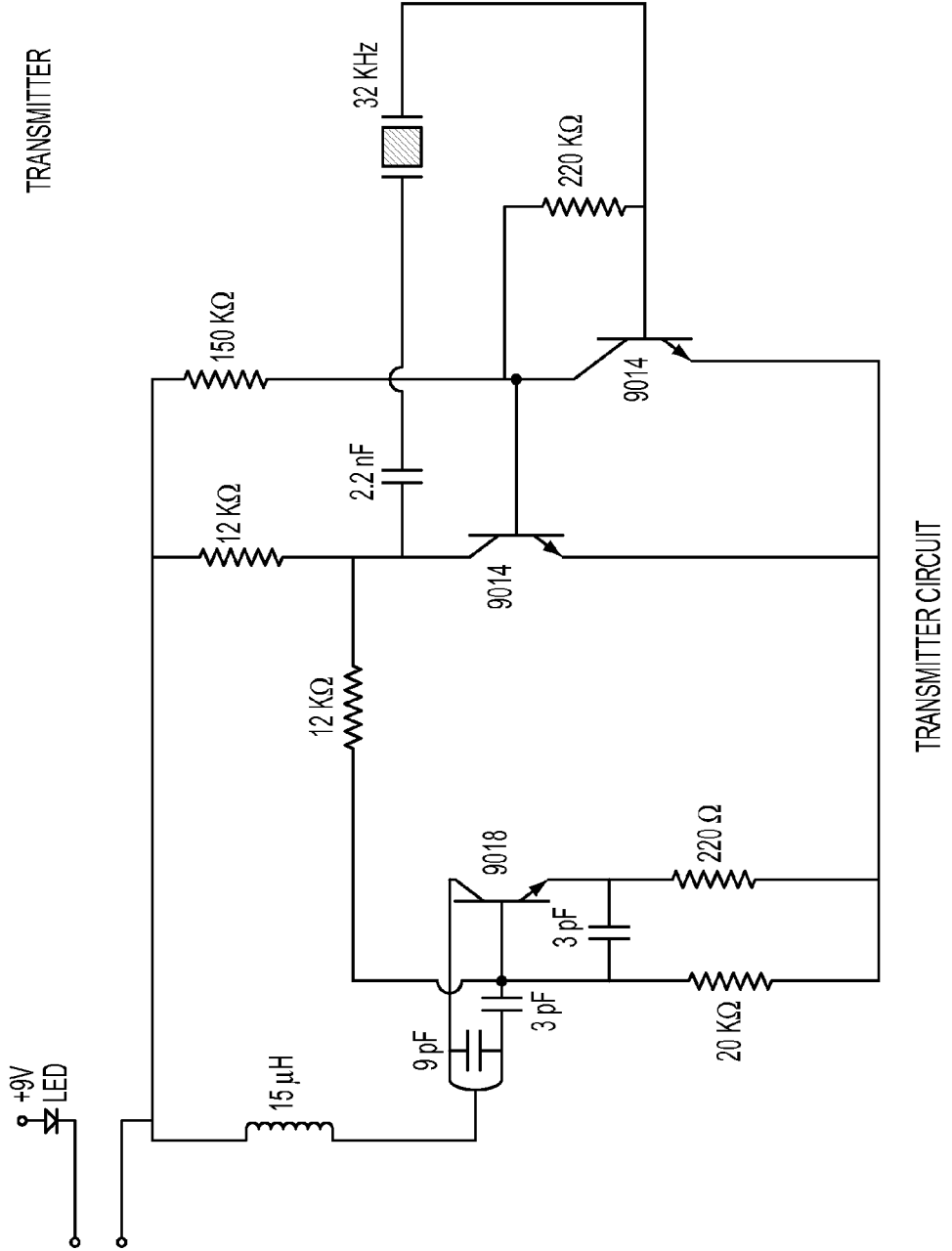
FIG. 10 is a schematic view of one aspect of an electrical circuit for an alarm module with a vibration alarm.
Figure 11:
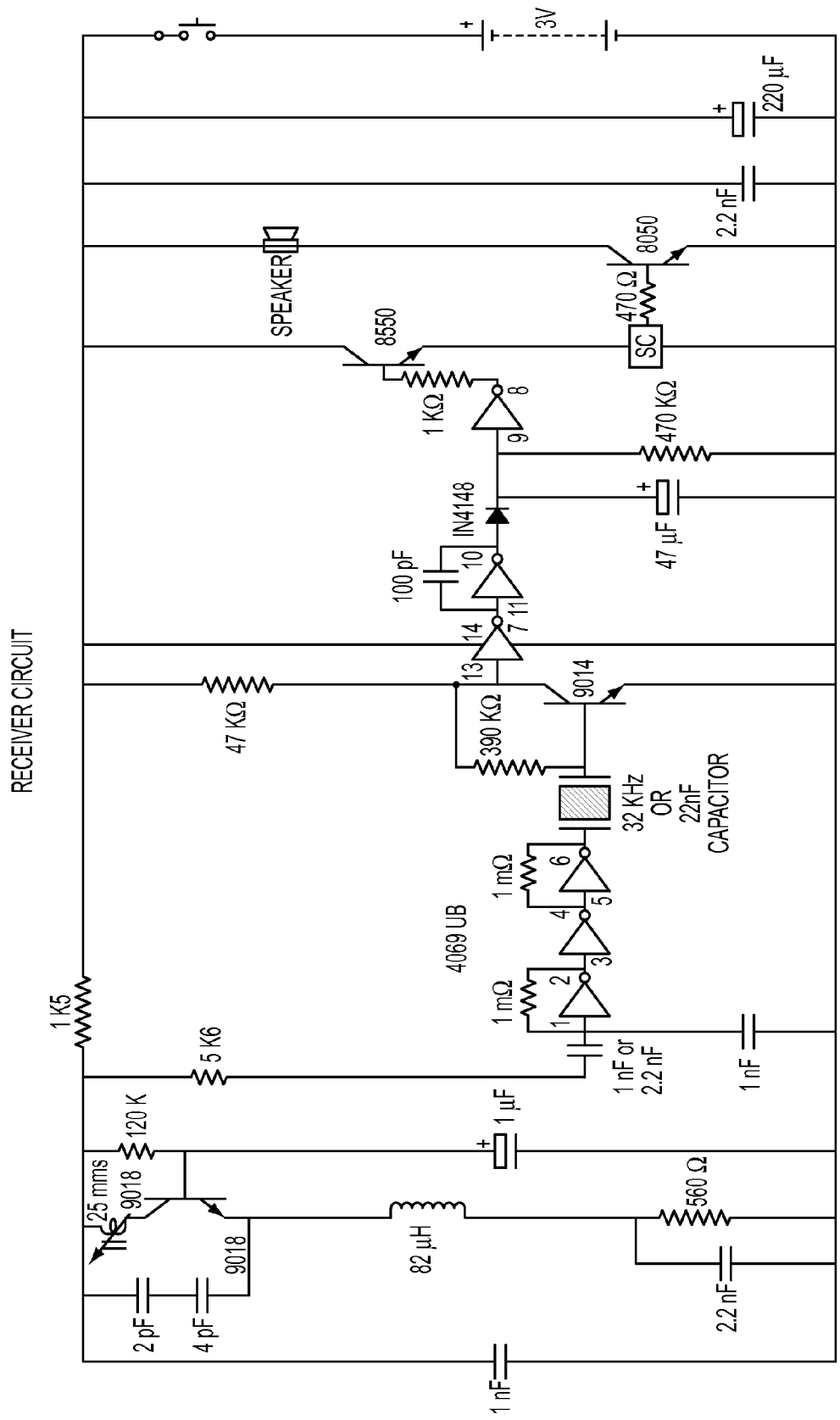
FIG. 11 is a schematic view of one aspect of an electrical circuit for a wireless transmitter for use with the alarm module.
Figure 12:
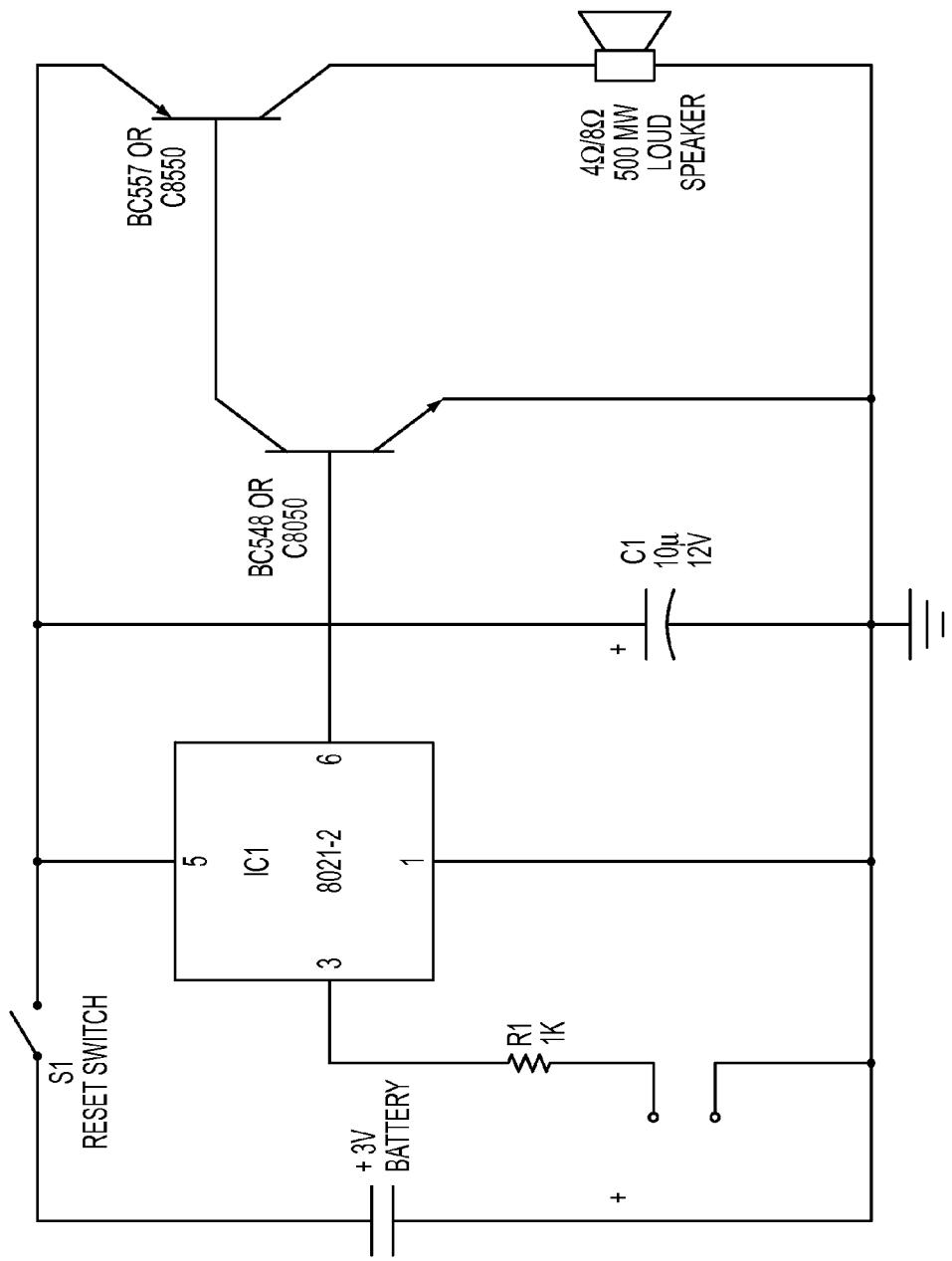
FIG. 12 is a schematic view of one aspect of an electrical circuit for a wireless receiver for use with the alarm module.

The present invention can be understood more readily by reference to the following detailed description, examples, drawing, and claims, and their previous and following description. However, before the present devices, systems, and/or methods are disclosed and described, it is to be understood that this invention is not limited to the specific devices, systems, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used throughout, the singular forms "a," "an" and "the" include plural referents unless the context clearly dictates otherwise. Thus, for example, reference to "a container" can include two or more such containers unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

Presented herein is fluid level alarm system 10. In one aspect, the alarm system 10 comprises a container 100 for storing fluid and alarm module 200 coupled to the container 100 for notifying a user, observer, or medical practitioner that the fluid within the container has reached a predetermined level.

As one skilled in the art can appreciate, there are several applications in which a fluid level alarm system can be utilized in a medical facility. For example, and not meant to be limiting, one may use the fluid level alarm system with an intravenous bag to alarm a practitioner when the bag has gone below a certain level. Similarly, one may use the fluid level alarm system with a urinary collection bag to alarm a practitioner when the bag has gone above a certain level.

In one aspect, the container has at least one exterior wall 110 and defines an interior volume 120 for at least temporary storage of fluid, a first opening 130, and a second opening 140 for exit of fluid. The first opening 130 can be for the ingress of fluid, in the case of a urinary collection bag or similar system. The first opening can also be for venting the interior volume 120 to the atmosphere, in the case of an intravenous bag or similar system. In one aspect, the first opening is positioned substantially at an upper portion of the container and the second opening 140 is positioned substantially at a lower portion of the container. In yet another aspect, the container 100 comprises a disposable flexible bag.

In another aspect, the first opening is configured to permit fluid entry and to prevent fluid exit via the first opening. For example, the first opening 130 may comprise a one-way valve 135 at least partially disposed in the first opening.

In yet another aspect, the second opening is configured to selectively permit exit of the fluid from the container. For example, the second opening may comprise a valve 145 at least partially disposed in the second opening.

The system can also comprise at least two electrodes 150, 155 disposed on an interior portion 115 of the exterior wall 110 of the container. The electrodes can comprise any electrically conductive material and, in one aspect, the electrodes comprise stainless steel. In another aspect, the electrodes comprise a corrosion resistant material. At least one of the electrodes is positioned at a position thereon an interior portion 115 of the exterior wall corresponding to a predetermined fluid level 160 at which it is desirable to receive an alarm. In this configuration, the fluid contained within the container completes a circuit between the at least two electrodes 150, 155. In one aspect, the electrodes lie in the same plane as the fluid at the predetermined level, but as one skilled in the art can appreciate, if one of the electrodes is higher on the container's wall, the upper-most electrode will be positioned at a level corresponding to the predetermined fluid level 160.

The system also comprises an alarm module 200 coupled to a power supply 275. The alarm module comprises at least two terminals 210, 215, each terminal in electrical communication with one of the at least two electrodes. The alarm module houses the alarm 220, which can be visible, audible, vibrating, or a combination thereof. In one aspect, the visible alarm 220 comprises a light emitting diode. In use, in one aspect, when the fluid in the container 100 reaches the predetermined fluid level, the fluid disposed within the interior volume of the container completes an electrical circuit between the at least two electrodes and the alarm module. This energizes the alarm 220 and alerts the practitioner that the fluid has met or has exceeded the predetermined level.

The alarm module 200 can comprise an electronic circuit board 260 configured to perform the functions of the alarm module. The circuit board can comprise a plurality of distinct circuits, as illustrated in the accompanying figures. One skilled in the art can appreciate that the alarm module can be configured in a plurality of ways. The applicant has illustrated at least one way in which to configure the electronic circuit board. In another aspect, the alarm module 200 can have a battery test switch 270 coupled to the circuit board and the battery 275, as well as a battery level indicator light 280 coupled to the test switch between the test switch and the battery. In one aspect, the alarm module can comprise a unit function test switch 290 coupled to the circuit board.

As one skilled in the art can appreciate, the power supply coupled to the alarm module comprises AC power, or it may comprise, for example, and not meant to be limiting, DC power, from a source such as a battery or battery bank.

The alarm module can be spaced from the container, or it may be attached thereto. In one aspect, the alarm module is removably attached to the container via hooks, snaps, VELCRO, or other conventional attachment means. In both cases, the electrodes can be hard wired to the alarm module 200, or they can connect to the alarm module using common connection means, such as a male and female plug. As one skilled in the art can appreciate, if the electrodes are connected to the alarm module in a removable manner, the alarm module can be reused with any number of containers.

The fluid level alarm system described herein can be configured to have one alarm unit, which is coupled to the fluid container 100, or it can have two alarm units; one coupled to the fluid container and one remote from the fluid container. In one aspect, the alarm module 200 comprises a primary alarm unit 230 and a secondary alarm unit 240. In such a system, the primary alarm unit 230 comprises a transmitter 235 for transmission of at least one signal representing an alarm, and the secondary alarm unit 240 comprises a receiver 245 for reception of the at least one signal representing the alarm. As such, the primary alarm unit can be permanently attached to the fluid container, or it can be selectively detachable therefrom. The signal can be transmitted via a wired connection, in one aspect, or the signal can be transmitted via a wireless connection, in another aspect.

In the case of a primary and secondary alarm unit, the system can be set up such that both alarm units comprise alarms (visible, audible, etc.), or such that only one of the alarm units comprises an alarm. In yet another aspect, the secondary alarm unit may comprise a conventional beeper, cell phone, or other known receiving devices.

In one aspect, the secondary alarm unit may be configured to monitor several primary alarm units. In such a system, the container comprises a plurality of containers, each connected to a primary alarm unit, where each primary alarm unit 230 is in communication with the secondary alarm unit 240. In this case, the secondary alarm unit can comprise a plurality of communication channels 250, each configured to communicate with a discrete primary alarm unit.

As alluded to herein above, the system can be set up to monitor one or more containers that are normally empty and configured to activate an alarm when the fluid reaches a predetermined level. In such a configuration, the alarm would be activated when the circuit is complete between the electrodes in the container 100. In the alternative, the system can also be set up to monitor one or more containers that are normally full and configured to activate an alarm when the fluid goes below a predetermined level. For example, this configuration would be used for an intravenous bag. In this configuration, the alarm would be activated when the circuit is open between the electrodes in the container 100.

In one alternative aspect, the system can comprise a tilt switch 300 to sense when the container is substantially not in the upright position. As such, the tilt switch 300 can help avoid a false alarm caused by the container falling on its side. Additionally, the system may comprise a delay switch (not shown), configured to delay the alarm signal in instances where the circuit is temporarily closed prematurely. As one skilled in the art can appreciate, any conventional applicable delay switch can be utilized. In another aspect, the tilt switch is attached directly to the container 100. However, in one aspect, wherein the primary alarm unit (or alarm module in embodiments in which there are only one alarm unit), is removably attached to a portion of the container, the tilt switch can be located on or within the primary alarm unit.

In one aspect, the system comprises a tilt switch having first and second tilt terminals 310, 315, where the tilt switch is configured to sense when the container is substantially not in an upright position. The tilt switch 300 can be configured to open the circuit between the fluid, the two electrodes, and the alarm module when the container is not in the upright position. In another aspect, the at least two electrodes comprise a first electrode 150 and a second electrode 155, where the first electrode is electrically coupled to the first alarm terminal 210, the second electrode is electrically coupled to first tilt terminal 310, and the second tilt terminal 315 is electrically coupled to the second alarm terminal 215.

As one skilled in the art can appreciate, any known tilt switch can be utilized. In one exemplary aspect, the tilt switch of the present system comprises a substantially cylindrical body 320 defining an interior chamber 330, and an electrically conductive, substantially spherical tilt mechanism 340 positioned therein the interior chamber 330. As illustrated in FIG. 1, the substantially cylindrical body 320 can be positioned thereon an external portion of the exterior wall 110 such that, when the container 100 is in a substantially upright position, the electrically conductive, substantially spherical tilt mechanism 340 is held in contact with the first and second tilt terminals by gravity. In contrast, when the container is not substantially in the upright position, the substantially spherical tilt mechanism moves within the interior chamber and out of contact with at least one of the first and second tilt terminals, thereby opening the tilt switch. It is contemplated that the tilt mechanism can be other than spherical, however, a spherical tilt mechanism rolls well within the interior chamber.

As mentioned herein above, the system can comprise a delay switch electrically positioned between at least one of the electrodes and the alarm module 200, substantially preventing completion of the circuit for a predetermined length of time. This exemplary aspect can also assist in the prevention of false alarms.

Although several embodiments of the invention have been disclosed in the foregoing specification, it is understood by those skilled in the art that many modifications and other embodiments of the invention will come to mind to which the invention pertains, having the benefit of the teaching presented in the foregoing description and associated drawings. It is thus understood that the invention is not limited to the specific embodiments disclosed hereinabove, and that many modifications and other embodiments are intended to be included within the scope of the appended claims. Moreover, although specific terms are employed herein, as well as in the claims which follow, they are used only in a generic and descriptive sense, and not for the purposes of limiting the described invention, nor the claims which follow.

The invention claimed is:

1. A fluid level alarm system comprising: a container having at least one exterior wall and defining an interior volume for at least temporary storage of fluid, a first opening, and a second opening for exit of fluid; at least two electrodes disposed on an interior portion of the exterior wall, wherein at least one of the electrodes is positioned at a position thereon an interior portion of the exterior wall corresponding to a predetermined fluid level; an alarm module coupled to a power supply, the alarm module comprising first and second alarm terminals, each in electrical communication with one of the at least two electrodes and having alarm means; and wherein, at the predetermined fluid level, the fluid disposed within the interior volume of the container completes an electrical circuit between the at least two electrodes and the alarm module; and wherein the container is a flexible bag; and wherein the alarm module is configured for releasable attachment to a portion of the container and wherein the alarm system further comprises a tilt switch positioned thereon a portion of the alarm module, the tilt switch having first and second tilt terminals and is configured to sense when the container is substantially not in an upright position.

2. The fluid level alarm system of claim 1, wherein the at least two electrodes are substantially co-planar with the fluid when the fluid is at the predetermined fluid level.

3. The fluid level alarm system of claim 1, wherein the electrodes comprise a corrosion resistant material.

4. The fluid level alarm system of claim 3, wherein the corrosion resistant material comprises stainless steel.

5. The fluid level alarm system of claim 1, wherein the first opening is positioned substantially at an upper portion of the container and the second opening is positioned substantially at a lower portion of the container.

6. The fluid level alarm system of claim 5, wherein the first opening is configured to facilitate fluid ingress into the interior volume of the container.

7. The fluid level alarm system of claim 6, further comprising means for permitting fluid entry via the first opening and preventing fluid exit via the first opening.

8. The fluid level alarm system of claim 7, wherein the means for permitting fluid entry via the first opening and preventing fluid exit via the first opening comprises a one-way valve at least partially disposed in the first opening.

9. The fluid level alarm system of claim 1, further comprising means for selectively permitting exit of the fluid from the container.

10. The fluid level alarm system of claim 9, wherein the means for selectively permitting exit of the fluid from the container comprises a valve at least partially disposed in the second opening.

11. The fluid level alarm system of claim 1, wherein the first opening is configured to vent the interior volume of the container to the atmosphere.

12. The fluid level alarm system of claim 1, wherein the power supply coupled to the alarm module comprises AC power.

13. The fluid level alarm system of claim 1, wherein the power supply coupled to the alarm module comprises at least one battery.

14. The fluid level alarm system of claim 1, wherein the alarm means comprises a visible alarm.

15. The fluid level alarm system of claim 14, wherein the visible alarm comprises a light emitting diode.

16. The fluid level alarm system of claim 1, wherein the alarm means comprises an audible alarm.

17. The fluid level alarm system of claim 1, wherein the alarm means comprises a vibrating alarm.

18. The fluid level alarm system of claim 1, wherein the alarm module comprises a primary alarm unit and a secondary alarm unit, and wherein the primary alarm unit comprises a transmitter for transmission of at least one signal representing an alarm, and the secondary alarm unit comprises a receiver for reception of the at least one signal representing the alarm.

19. The fluid level alarm system of claim 18, wherein the primary alarm unit comprises a transmitter for wireless transmission of at least one signal representing an alarm, and the secondary alarm unit comprises a receiver for wireless reception of the at least one signal representing the alarm.

20. The fluid level alarm system of claim 18, wherein the primary alarm unit is selectively detachable from the container.

21. The fluid level alarm system of claim 18, wherein the secondary alarm unit is remote from the primary alarm unit and wherein at least the secondary alarm unit comprises alarm means.

22. The fluid level alarm system of claim 18, wherein the container comprises a plurality of containers, each connected to a primary alarm unit, wherein each primary alarm unit is in communication with the secondary alarm unit.

23. The fluid level alarm system of claim 1, wherein the tilt switch is configured to open the circuit between the fluid, the two electrodes, and the alarm module when the container is not in the upright position.

24. The fluid level alarm system of claim 23, wherein the at least two electrodes comprise a first electrode and a second electrode, and wherein the first electrode is electrically coupled to the first alarm terminal, the second electrode is electrically coupled to first tilt terminal, and the second tilt terminal is electrically coupled to the second alarm terminal.

25. The fluid level alarm system of claim 24, wherein the tilt switch comprises:
   a substantially cylindrical body defining an interior chamber; and
   further comprising a tilt switch positioned thereon the container, the tilt switch having first and second tilt terminals and is configured to sense when the container is substantially not in an upright position;
an electrically conductive, substantially spherical tilt mechanism positioned therein the interior chamber, wherein the substantially cylindrical body is positioned thereon an external portion of the exterior wall such that, when the container is in a substantially upright position, the electrically conductive, substantially spherical tilt mechanism is held in contact with the first and second tilt terminals by gravity, and when the container is not substantially in the upright position, the substantially spherical tilt mechanism moves within the interior chamber and out of contact with at least one of the first and second tilt terminals, thereby opening the tilt switch.

26. The fluid level alarm system of claim 1, further comprising a delay switch electrically positioned between at least one of the electrodes and the alarm module, substantially preventing completion of the circuit for a predetermined length of time.

* * * * *